(12) United States Patent
Czechtizky

(10) Patent No.: US 9,102,219 B2
(45) Date of Patent: Aug. 11, 2015

(54) WIND DEFLECTOR

(71) Applicant: Dr. Ing. h.c. F. Porsche Aktiengesellschaft, Stuttgart (DE)

(72) Inventor: Timo Czechtizky, Zell unter Aichelberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/506,821

(22) Filed: Oct. 6, 2014

(65) Prior Publication Data

US 2015/0108795 A1    Apr. 23, 2015

(30) Foreign Application Priority Data

Oct. 21, 2013  (DE) .................. 10 2013 111 566

(51) Int. Cl.
*B60J 7/22*    (2006.01)
(52) U.S. Cl.
CPC ......................................... *B60J 7/22* (2013.01)
(58) Field of Classification Search
CPC ........................................................ B60J 7/22
USPC ........................................................ 296/217
See application file for complete search history.

(56) References Cited

U.S. PATENT DOCUMENTS

| 4,492,406 | A | * | 1/1985 | Matsubara .................... 296/217 |
| 4,966,409 | A | * | 10/1990 | Schmidhuber et al. ....... 296/213 |
| 5,833,305 | A | * | 11/1998 | Watzlawick et al. .......... 296/217 |
| 6,286,899 | B1 | | 9/2001 | Hirschvogel et al. |
| 7,121,618 | B2 | * | 10/2006 | Uehara et al. ................. 296/217 |
| 8,056,968 | B2 | * | 11/2011 | Fidan et al. ................... 296/217 |
| 2008/0157561 | A1 | * | 7/2008 | Farber ......................... 296/180.5 |
| 2010/0164254 | A1 | | 7/2010 | Fidan et al. |
| 2015/0076870 | A1 | | 3/2015 | Pfertner et al. |

FOREIGN PATENT DOCUMENTS

DE        19520348        8/1996
DE        102008058158    5/2010

OTHER PUBLICATIONS

British Appl. No. 1418126.7—Combined Search and Examination Report issued Apr. 15, 2015.

* cited by examiner

*Primary Examiner* — Dennis H Pedder
(74) *Attorney, Agent, or Firm* — Gerald E. Hespos; Michael J. Porco; Matthew T. Hespos

(57) ABSTRACT

A wind deflector (1) for a roof opening of a motor vehicle has a receptacle (4) and a first deployable segment (2). A four-bar linkage connection is configured by two links (5, 6) between the first deployable segment (2) and the receptacle (4). Each link (5, 6) is connected pivotally at one of its end regions (7) to the first segment (2) and at the receptacle (4). A second segment (3) is arranged substantially parallel to the first segment (2) and is connected pivotally to the two links (5, 6) in each case in a central region (8) of the links (5, 6).

8 Claims, 2 Drawing Sheets

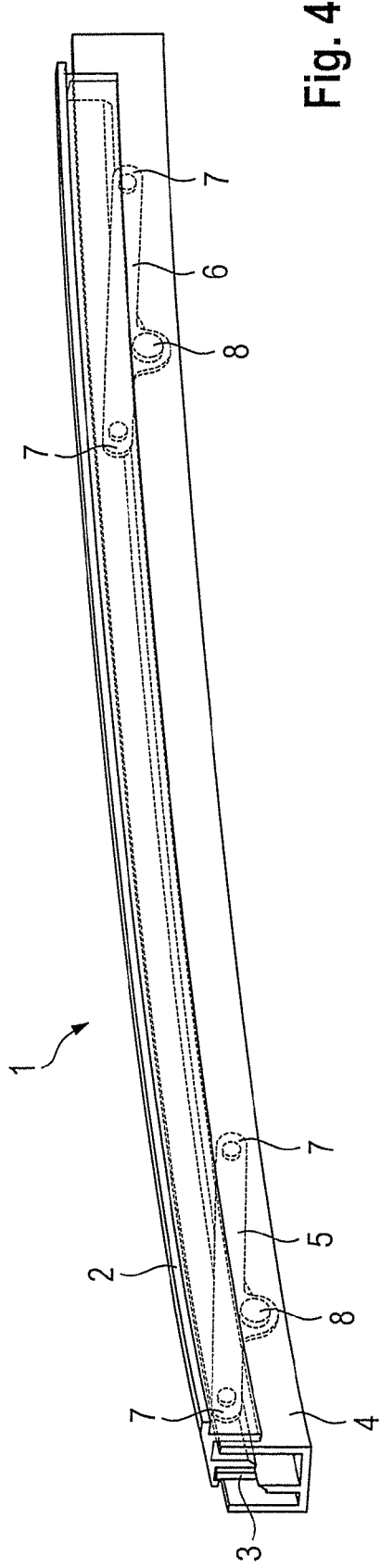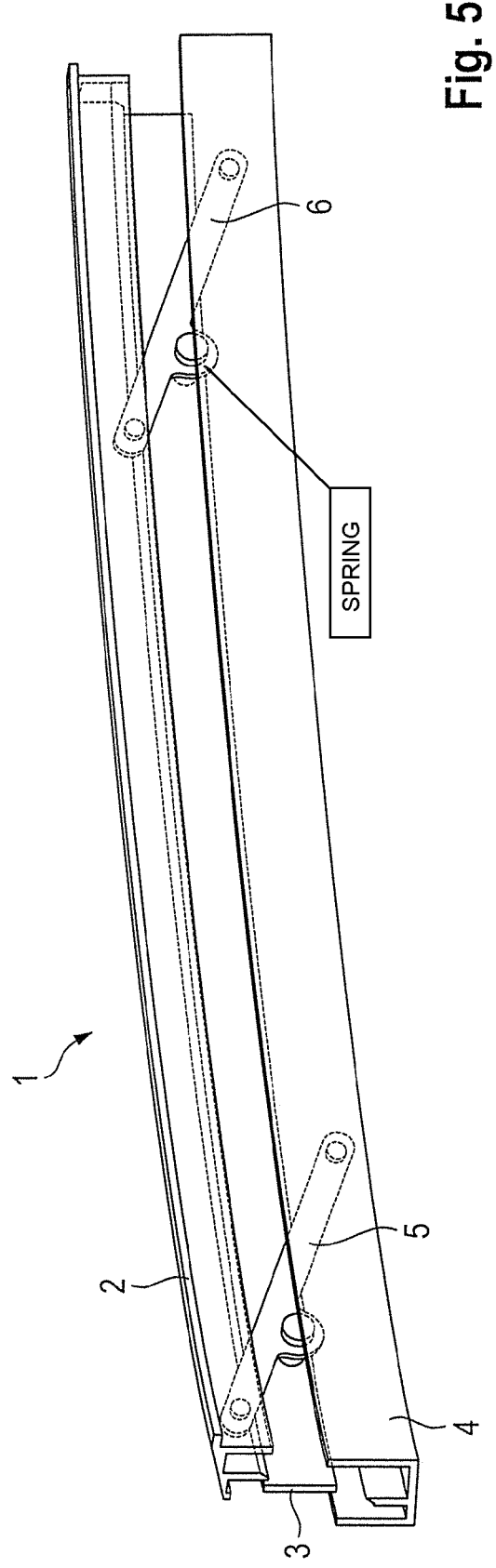

WIND DEFLECTOR

CROSS-REFERENCE TO RELATED APPLICATION

This application claims priority under 35 USC 119 to German Patent Application No. 10 2013 111 566.7 file on Oct. 21, 2013, the entire disclosure of which is incorporated herein by reference.

BACKGROUND

1. Field of the Invention

The invention relates to a wind deflector for a roof opening of a motor vehicle.

2. Description of the Related Art

Wind deflectors are used at roof openings of motor vehicles to reduce unpleasant noises that are produced by incident air at a roof opening. The roof opening may be an opening of a sunroof or a cabriolet roof.

Wind deflectors of this type have a mechanism to move the wind deflector from a retracted position into a deployed position and vice versa. For instance, DE 195 20 348 C1 discloses a wind deflector with three segments are arranged one behind another in a receptacle in the retracted position. Each segment can be deployed by an actuating arm arranged on the side of the roof opening and can be deployed in the opposite direction to the driving direction. This type of deployment of the wind deflector requires a relatively large amount of space on the side of the roof opening for the actuating arm. In addition, only the uppermost segment is supported by the actuating arms. As a result the segments that are arranged underneath are supported only indirectly via other segments. This reduces the stability of the wind deflector in the incident air flow during driving of the vehicle.

It is therefore an object of the invention to provide a wind deflector that is of simple construction, has a stable design in the deployed position and requires only a small amount of installation space.

SUMMARY OF THE INVENTION

The invention relates to a wind deflector for a roof opening of a motor vehicle. The wind deflector has a receptacle, a first deployable segment and a four-bar linkage connection configured by two links between the first deployable segment and the receptacle. Each link is connected at one of its end regions to the first segment and at the receptacle in an articulated manner. A second segment is arranged substantially parallel to the first segment. The second segment is connected in an articulated manner to a central region of each of the links. As a result, a stable attachment of the segments of the links is achieved and only a small amount of installation space is required.

The second segment may be a perforated or unperforated segment to achieve a desired influence on the air flow. The first segment also can be a perforated or unperforated segment.

The links may be arranged substantially parallel to one another, and may maintain their parallel orientation over substantially the entire pivoting range of the links. In this regard, the links may be parallel to a plane of the first and/or second segment.

The receptacle may be a unitarily formed profile element that has first and second parallel walls that are connected by a bottom wall. A web may be connected to the bottom wall and may be oriented substantially parallel to the first and second walls.

The first segment also may be a unitary profile element with first and second spaced apart parallel webs. The webs may be connected by a cover.

The cover may cover the receptacle between the first and the second walls in the retracted position of the wind deflector. As a result, the wind deflector is protected against dirt and damage in the retracted position.

The first web of the first segment may be flush with the web of the receptacle in the retracted position of the wind deflector to form a suitable receptacle for the second segment.

The second segment may be arranged between a wall and a web of the receptacle in the retracted position.

A spring may be arranged with prestress between the receptacle and at least one link. The spring loads the link in the direction of the deployed position.

BRIEF DESCRIPTION OF THE DRAWINGS

FIG. 4 is an elevational view of a wind deflector in the retracted position.

FIG. 5 is an elevation view of a wind deflector in the deployed position.

DETAILED DESCRIPTION

Figure 1:
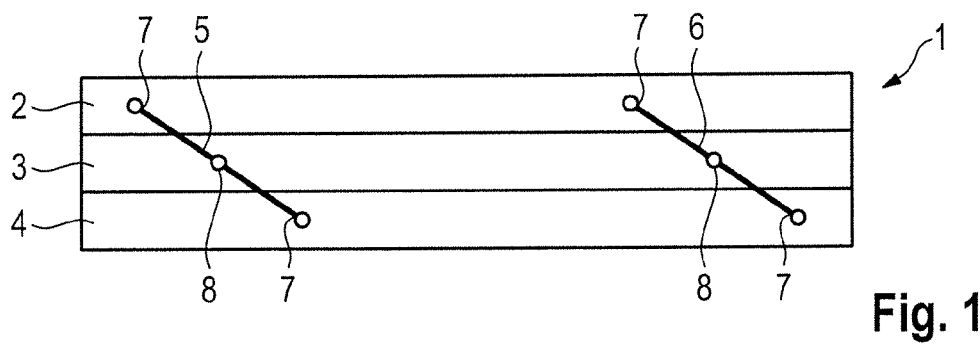
FIG. 1 is a diagrammatic view of a wind deflector having two deployable segments and a receptacle.

FIG. 1 is a schematic illustration of a wind deflector 1 having a first deployable segment 2, a second segment 3, a receptacle 4, and two links 5, 6 arranged between the receptacle 4 and the first segment 2. The links 5, 6 are connected pivotally or in an articulated manner in their end regions 7 both to the receptacle element 4 and to the first segment 2. Furthermore, the second segment 3 is connected in an articulated manner to a central region 8 of each the link 5, 6. A spring may be mounted at one or more of the pivotal connections to bias the wind deflector toward a deployed position.

FIG. 1 shows the wind deflector 1 in a deployed position, in which the segments 2, 3 have moved up and out of the receptacle 4. The segments 2, 3 are deployed with respect to the receptacle 4 by pivoting the links 5, 6. In a retracted position (not shown), the segments 2, 3 are arranged in the receptacle 4. This position is reached by rotating the links 5, 6 down in the counterclockwise direction.

Figure 2:
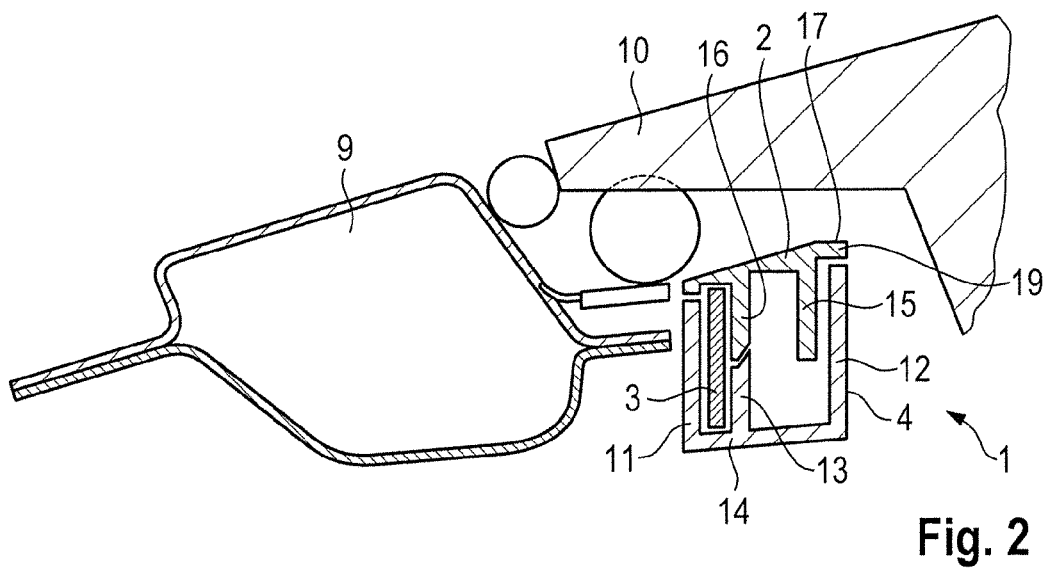
FIG. 2 is a sectional view of a wind deflector in the retracted position
Figure 3:
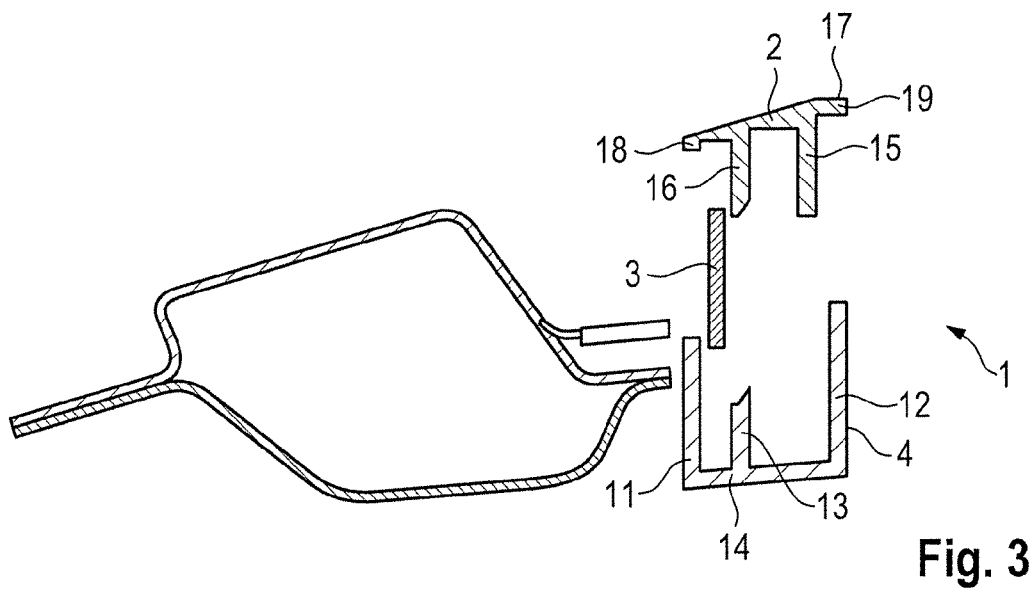
FIG. 3 is a sectional view of a wind deflector in the deployed position.

FIGS. 2 and 3 show the wind deflector 1 in a sectional illustration with a window frame 9 and a roof element 10 to be opened. The roof is fastened to the window frame 9 by the roof element 10 and therefore is closed in FIG. 2, with the wind deflector 1 being in a retracted position. However, the roof is opened and the wind deflector is in a deployed position in FIG. 3.

As shown in FIGS. 2 and 3, the wind deflector 1 comprises three pieces, namely, the receptacle 4, the second segment 3 and the first segment 2.

The receptacle 4 is a unitarily formed profile element that may be extruded or otherwise formed with two substantially parallel spaced apart walls 11, 12. A web 13 is provided between the walls 11, 12 and has a vertical extent of only about half the vertical extent of the walls 11, 12. Bottom ends of the walls 11, 12 and the web 13 are connected to a bottom wall 14. As a result, the receptacle 4 is configured substantially as an E lying on its back. In the retracted position, the second segment 3 is in a part of the receptacle between the wall 11 and the web 13.

As viewed in section, the first segment 2 is of similar configuration to the Greek letter Π, with two webs 15, 16 arranged substantially parallel to one another and connected unitarily to one another via a cover 17. The cover 17 runs at an angle that does not equal 90°, and hence is aligned obliquely to the webs 15, 16. The front region of the cover 17, as viewed in the driving direction of the vehicle, has a downwardly directed lug 18. The free end of the lug 18 is arranged substantially on the wall 11 when the first segment is in retracted state of FIG. 2. The cover 17 also has a projection 19 that is arranged on the end region of the wall 12 and comes to lie there in retracted state of FIG. 2. The web 16 is dimensioned to define a coplanar extension of the web 13 in retracted state of FIG. 2. To this end, the web 16 has a bevel at its leading end, against which bevel an oblique chamfer of the web 13 bears.

FIG. 3 shows the wind deflector 1 in a deployed position, with the second segment 3 having moved out of the part of the receptacle 4 between the wall 11 and the web 13, but with there still being a slight overlap in the vertical direction between the wall 11 and the segment 3. The first segment 2 also has deployed up, and there also still is a slight overlap in the axial direction between the second segment 3 and the web 16. This has the effect that no substantial air flow can flow through between the receptacle element 4 and the second segment 3 and between the second segment 3 and the first segment 2, but rather the air flow is directed substantially over the first segment 2.

FIGS. 4 and 5 show the wind deflector 1 in a retracted position and in a deployed position, respectively. It can be seen in FIG. 4 that the first segment 2 and the second segment 3 are arranged within the receptacle 4 and above the receptacle element 4, respectively, to cover the second segment 3 and the interior of the receptacle element 4. The links 5, 6 are arranged substantially horizontally or incline only slightly. More particularly, end regions 7 of the links 5, 6 are connected in an articulated manner to the first segment 2 and the receptacle 4 and are connected pivotally in a central region 8 of the second segment 3.

FIG. 5 shows the wind deflector 1 in a deployed position. The links 5, 6 are deployed and the first segment 2 and the second segment 3 therefore are pulled out of the receptacle 4 and raised to form a substantially closed deployed wall.

What is claim is:

1. A wind deflector for a roof opening of a motor vehicle, comprising: a receptacle; a first deployable segment; two links between the first deployable segment and the receptacle, each link having a first end connected pivotally to the first segment and a second end connected pivotally to the receptacle, a second segment arranged substantially parallel to the first segment, the second deployable segment being connected pivotally to each of the two links at a central region of the respective link.

2. The wind deflector of claim 1, wherein the two links are arranged substantially parallel to one another.

3. The wind deflector of claim 1, wherein the receptacle is a profile element that has first and second substantially parallel spaced apart walls and a bottom wall connecting bottom ends of the first and second, a web projecting from the bottom wall, the web being substantially parallel to the first and the second wall and between the first and second walls.

4. The wind deflector of claim 1, wherein the first segment is a profile element that has first and second substantially parallel spaced apart webs extending from a cover.

5. The wind deflector of claim 4, wherein, in a retracted position of the wind deflector, the cover covers the receptacle between the first and second walls.

6. The wind deflector of claim 5, wherein, in the retracted position of the wind deflector, the first web of the first segment is substantially flush with the web of the receptacle.

7. The wind deflector of claim 5, wherein, in the retracted position, the second segment is arranged between a wall and a web of the receptacle.

8. The wind deflector of claim 5, further comprising a spring arranged with prestress between the receptacle and at least one of the links, the spring loading the at least one link in the direction of the deployed position.

* * * * *